United States Patent
Zhou et al.

(10) Patent No.: US 6,324,599 B1
(45) Date of Patent: Nov. 27, 2001

(54) COMPUTER SYSTEM AND METHOD FOR TRACKING DMA TRANSFERRED DATA WITHIN A READ-AHEAD LOCAL BUFFER WITHOUT INTERRUPTING THE HOST PROCESSOR

(75) Inventors: Ning Zhou, Fremont; Steven E. Olson, Los Altos, both of CA (US)

(73) Assignee: Oak Technology, Sunnyvale, CA (US)

(*) Notice: Subject to any disclaimer, the term of this patent is extended or adjusted under 35 U.S.C. 154(b) by 0 days.

(21) Appl. No.: 09/228,477

(22) Filed: Jan. 11, 1999

(51) Int. Cl.$^7$ .......................... G06F 13/14; G06F 13/12; G06F 12/00
(52) U.S. Cl. ................. 710/26; 710/22; 710/24; 711/1
(58) Field of Search .................... 710/5, 22, 26, 710/52, 24; 711/1–6, 112, 113; 713/502

(56) References Cited

U.S. PATENT DOCUMENTS

| | | |
|---|---|---|
| 5,251,312 | 10/1993 | Sodos . |
| 5,388,219 * | 2/1995 | Chan et al. ............................. 710/5 |
| 5,581,741 * | 12/1996 | Clark et al. ............................ 703/25 |
| 5,845,308 * | 12/1998 | Dockser ................................ 711/3 |
| 6,018,788 * | 1/2000 | Ichikawa ............................ 711/113 |
| 6,170,063 * | 1/2001 | Golding ............................... 713/502 |

FOREIGN PATENT DOCUMENTS

358159154-A  *  9/1983  (JP) .
360241136-A  *  11/1985 (JP) .
406035620-A  *  2/1994  (JP) .

* cited by examiner

Primary Examiner—Thomas Lee
Assistant Examiner—Ihuan Du
(74) Attorney, Agent, or Firm—Kevin L. Daffer; Conley, Rose & Tayon P.C.

(57) ABSTRACT

A computer system or computer system main memory is provided. The computer system includes a secondary memory and a buffer. The buffer is one having a faster access time than the secondary memory, and data placed within the buffer can be controlled by a control block configured with a control field and a byte count value of data bytes transferred during a DMA cycle, or a chain of DMA cycles. A counter may be used to increment the byte count within one or more control blocks during transfer of data bytes from secondary memory to the buffer. A requester is coupled to forward a read request that is serviced from the buffer if an address of the read request is included within an address incremented by the byte count. Both the control blocks and the buffer can be contained within a main memory local to the requester. Each control block includes a pointer field which points to a respective storage region of the buffer, and also contains the byte count field incremented during transfer of data bytes to one or more of the storage regions. If the previous read request address incremented by the byte count value encompasses the current read request address, then the current read request will be serviced entirely from the faster buffer rather than the slower secondary memory.

19 Claims, 4 Drawing Sheets

COMPUTER SYSTEM AND METHOD FOR TRACKING DMA TRANSFERRED DATA WITHIN A READ-AHEAD LOCAL BUFFER WITHOUT INTERRUPTING THE HOST PROCESSOR

BACKGROUND OF THE INVENTION

1. Field of the Invention

This invention relates to a computer system and, more particularly, to a direct memory access ("DMA") controller which tracks DMA data transfers to a read-ahead buffer that is local to the computer system host processor without interrupting the processor.

2. Description of the Related Art

A time-consuming activity of a microprocessor entails moving blocks of memory from one subsystem within a computer system to another subsystem. The memory-moving chores can, in some instances, be handled by a DMA controller.

A DMA controller may include a specialized processor and numerous registers which keep track of the base location or source from which bytes of data are to be moved, the address or destination to where those bytes should be placed, and the number of bytes involved in the move operation. By noting the source, destination, and general operating parameters of the DMA transfer, the DMA controller allows direct communication from a peripheral device to main memory. The main memory is often denoted as "semiconductor" memory, which typically has a faster access time than devices connected to the peripheral bus (i.e., peripheral devices). The DMA controller provides communication with minimal involvement of the host processor.

The mechanism by which the DMA controller provides a channel between the peripheral device and the system memory occurs in accordance with a channel program or control blocks programmed within the system memory. Control blocks contain fields which are programmed with values that, when fetched by the DMA controller, instructs the DMA controller to transfer the desired data to or from main memory. In addition to a transfer control field, each control block may also include a field which points to a specific buffer that is typically arranged for the DMA controller. That buffer can then be used to receive data transferred from a peripheral device (or transferred from the system memory) depending on whether the DMA transfer operation is a read request or write request.

The control blocks are essentially storage locations within the system memory, and allocated by the device driver software. An important advantage in using control blocks is that one control block can point to a successive control block, and so forth to form a "chain" of control blocks. Therefore, each control block is used to control a single DMA transfer of data, and by linking numerous control blocks together in a chain, a sequence of DMA transfers can occur without host processor intervention. Thus, in addition to the transfer control field and the buffer pointer field, each control block may also have a pointer field directed to the next control block within the sequence. A description of control blocks, and control block chaining, is set forth in further detail within, for example, U.S. Pat. No. 5,251,312 (herein incorporated by reference).

The mechanism of chaining control blocks together can therefore be used to create a read-ahead buffer and allows many DMA transfers to occur without host processor intervention, provided the processor or the read requester is periodically informed of the whereabouts of that DMA transferred data. This implies that after data is transferred to a buffer via a control block, the address locations of the DMA transferred bytes be recorded in the read requester which will eventually call upon that data. Generally an interrupt signal is used to interrupt the host processor to inform the read requester that the buffer has reached a certain level of "fullness". Since the read requester (e.g., processor, application program or operating system) now has information on the status of data bytes transferred from a specific address range of a peripheral (e.g., peripheral device address or device logic address) which sourced the DMA transfer, the read requester can then select that data from the buffer rather than the peripheral device if the read requested address matches with the addressed data stored within the buffer.

Placing data transferred from a slower peripheral device into a faster buffer during a DMA transfer proves beneficial if the data transferred is subsequently called upon by the read requester or host processor. For example, data can be transferred from a peripheral device according to a sequentially increasing and contiguous address space used by that device. That data is then sequentially placed into the buffer until the buffer is substantially full. When this occurs, it is important that the host processor be informed that data within a certain address range resides in a faster access, local buffer. Accordingly, any read requests issued by the processor to that address range can be quickly serviced by the buffer in lieu of the slower peripheral device.

Unfortunately, each time an interrupt is forwarded to the processor the current execution unit of the processor must be temporarily halted until after the interrupt has been serviced. Servicing each interrupt also incurs processor overhead. A somewhat high interrupt rate can further limit the overall performance of the host processor. Using an interrupt to denote the fullness of the buffer will, to some extent, counteract the benefits of using a read-ahead buffer in the first place. That is, a buffer which receives slower DMA transfers and stores the DMA transferred data in readiness for a read request from the processor will beneficially improve the access time to that data by the processor. However, if the processor is frequently undergoing interrupt, whatever gains provided by the read-ahead buffer will be limited by detriments caused by frequent interrupts.

SUMMARY OF THE INVENTION

The problems outlined above are in large part solved by an improved DMA transfer technique which avoids interrupting the host processor at times when the read-ahead buffer (or "buffer") is being filled. More specifically, the location and quantity of data transferred to the buffer hereof is kept track of within the control blocks rather than through use of an interrupt. Each byte transferred during a DMA cycle will increment a value within a byte count field of a corresponding control block. That value will be retained within one or more control blocks within a chain, and will be called upon later to indicate if a subsequent read request from the processor is to an address located within the buffer.

The chain of control blocks and associated byte count fields are contained within main memory. Each time a control block initiates a DMA transfer to the buffer, that control block will note the number of bytes transferred within its own byte count field. If multiple DMA transfers occur, then multiple byte count fields in respective control blocks are incremented with the appropriate number of bytes transferred. The byte counts of each control block can be added together to form a cumulative byte count number during times when a read request is issued. The read request will either be serviced from the buffer or from the peripheral device depending on whether the immediately preceding read request address (i.e., previous request address) plus the cumulative byte count encompasses the current request address. If so, it is noted that the entirety of data needed by the current request is contained within the buffer. If none of the requested data, or only a portion of the requested data, is within the buffer, then the requested data will be entirely drawn from the peripheral device.

The peripheral device contains bytes of data arranged in a sequentially increasing, logical (or block) address space. The read-ahead DMA transfer will occur between read request cycles and, more importantly, will begin at the conclusion of the previous read request address up through the byte count number at which the current read request occurs, until the buffer is full, or the device driver terminates the transfer. If the current read request address is within the previous ending address plus the byte count number, then it will be known that the current read request can be entirely serviced from the faster buffer and not the slower peripheral device. Performing DMA transfers between read requests allows slower transfers to substantially fill a faster access buffer so that when the current read request occurs, that request might possibly be serviced entirely from the buffer. If the current read request is to an address space immediately following the previous read request, then it is likely that the current read request can be serviced entirely from the buffer.

The DMA transfer mechanism is typically implemented within a computer system. The computer system includes a buffer which operates to read-ahead data since the most recent read request. The buffer may be coupled to a secondary memory which has slower access time than the main memory or system memory. A control block may be configured with contiguous and sequential addresses within the secondary memory which contains a corresponding sequence of data bytes. A counter is adapted to increment a byte count within the control block as each of the sequence of data bytes is transferred from the secondary memory to the buffer. A read request forwarded from a read requester (e.g., software induced requester such as an application program or operating system) can be serviced from the buffer if an address of the read request is included within an address incremented by the byte count. Thus, if the current read request (i.e., a read request second in time) is to an address range of the peripheral device that is within an ending address of a previous read request (i.e., a read request which occurs first in time) incremented by the byte count, then the current read request can be serviced entirely from the buffer. The buffer is contained within main memory and is bifurcated into a series of memory blocks spaced across at least a portion of the main memory address space. Each block includes a destination for data, whose transfer is controlled by a respective control block. The memory blocks can be of variable size depending on the amount of contiguous memory available and the extent of each DMA transfer.

The computer system includes a hardware element and a software element. The hardware element performs many functions, one of which is to update the byte count value within a byte count field of one or more control blocks. A counter can be used to increment the byte count value, if desired. Importantly, the byte count is updated absent an interrupt signal being forwarded to the host processor. The memory blocks which constitute a buffer within main memory are filled in accordance with the chain of control blocks, and each byte transferred is recorded with a count stored within control blocks corresponding with respective memory blocks. If each and every memory block is filled, then the buffer will terminate reading of additional bytes absent an interrupt to the processor. However, if a read request occurs before the entire buffer is filled, then the byte count will record the most recent address of bytes transferred. That byte count, in addition to the address of the previous read request, will indicate if the current read request can be entirely serviced from the buffer.

The main memory includes a series of storage regions or blocks spaced throughout the main memory address range. A series of control blocks are also included within the main memory, each of which includes a pointer field and a byte count field. The pointer field is configured by the device driver software (i.e., peripheral device driver software provided with the peripheral device) to point to a corresponding storage block to indicate that each storage block is controlled by a corresponding, singular control block. The byte count field is incremented as each of a plurality of data bytes is transferred in address sequence from a secondary memory, such as a peripheral device, to the storage blocks during one or more DMA cycles. A value stored in the byte count field will denote an amount of sequentially addressed data bytes present within the storage regions that are available for a read request serviced entirely from those storage regions.

According to yet another embodiment, a method is provided for tracking the presence of data sequentially fetched from a secondary memory to a main memory. The method includes issuing a first read request by a data requester and noting a first address of the first read request within a sequential order of addresses. A byte count value is incremented for each byte of data fetched sequentially subsequent to the first read request address. A second read request can then be issued and determination made on whether the second read request can be serviced entirely from the main memory. If the second address of the second read request within the sequential order of addresses is less in sequential order then the sum of the first address incremented by the byte count, then it is determined that the second read request can be serviced entirely from the main memory.

BRIEF DESCRIPTION OF THE DRAWINGS

Other objects and advantages of the invention will become apparent upon reading the following detailed description and upon reference to the accompanying drawings in which.

Figure 1:
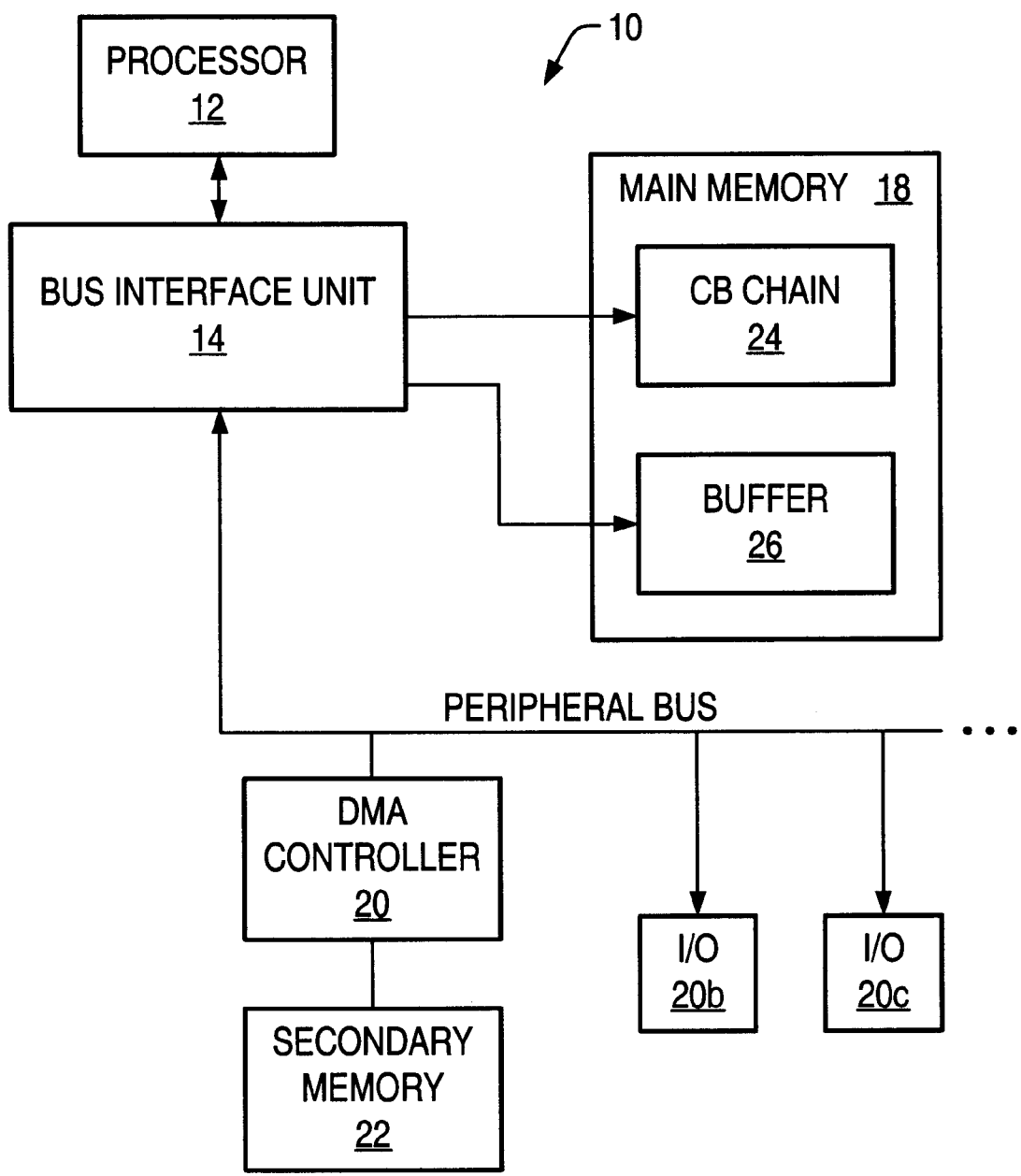
FIG. 1 is a block diagram of a computer system which includes a secondary memory storage device coupled to a read-ahead buffer bifurcated into a plurality of storage blocks that are accessible by pointers within corresponding control blocks.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning to the drawings, FIG. 1 illustrates a computer system 10 having multiple buses, including a CPU bus, a mezzanine or PCI bus, and other peripheral buses. The CPU bus connects to a host processor 12 and a bus interface unit 14. A cache memory can be embodied within processor 12, or coupled to the CPU bus.

Bus interface unit 14 provides an interface between components clocked at dissimilar rates. Interface unit 14 may also contain a memory controller which allows communication to and from main memory 18. Main memory 18 comprises a random access memory embodied upon a semiconductor substrate, and possibly partitioned among chips or DIMM structures. Main memory 18 can include any semiconductor memory referred to as a portion of addressable memory that the majority of memory accesses target. Main memory 18 is considered the largest continuous memory space of computer system 10. The DMA controller 20 interfaces with the secondary memory 22 and orchestrates DMA transfers to and from main memory 18.

Connected to interface unit 14 is a peripheral bus upon which various input/output controllers 20b and 20c, including the secondary memory's DMA controller 20, can be coupled. Another bus interface unit can be connected between different hierarchies of peripheral buses, such an interface unit is often referred to as a southbridge.

Input/output controllers 20b and 20c can be coupled either to a bus nearest interface unit 14, or to a bus emanating from a southbridge separate from interface unit 14. One input/output controller may be the DMA controller 20 which directly interfaces with an electromechanically driven memory system, henceforth referred to as a secondary memory 22. A suitable secondary memory includes a disk drive, CD ROM, CD-RW or DVD which has a slower access and latency times than main memory 18.

Included within main memory 18 is a memory location dedicated to receiving a chain of control blocks. The control block chain 24 is allocated and is programmed during execution by the device driver software during the driver initialization, or during execution of an operating system (OS) software associated with computer system 10. The device driver software code will configure a portion of main memory 18 as a control block chain, each of which is configured with various fields. Values stored in those fields dictate or control DMA transfers by DMA controller 20. Thus, the chain of control blocks 24 are linked to DMA controller 20, and control the operation of DMA transfers to and from buffer 26 within main memory 18.

Buffer 26, like control block chain 24, is configured either through the driver initialization or through operating system execution. Buffer 26 constitutes a set of storage blocks spaced at select regions within main memory 18. Data transferred from secondary memory 22 will be placed at the select storage blocks based on where, within memory 18, the corresponding control block is pointed. As will be described in more detail below, each control block within the chain includes a destination field, a source field, and a transfer link so as to keep track of the data transferred to main memory 18.

Figure 2:
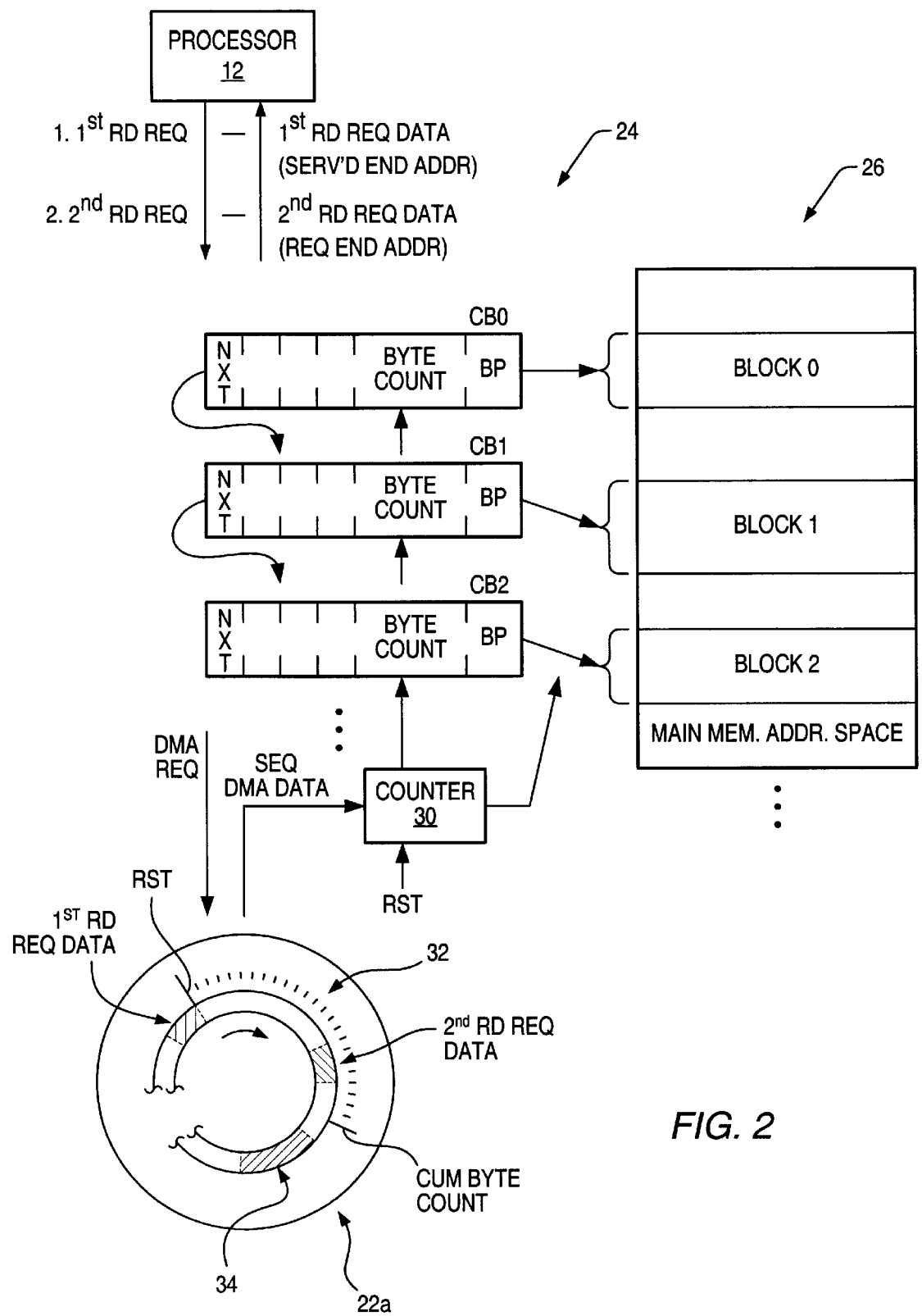
FIG. 2 is a block diagram of various control blocks which together target a contiguous address space within the secondary memory and increments a byte count within a corresponding control block for each byte of DMA data transferred to the read-ahead buffer, and which further services a next read request entirely with data within the buffer if an address of the previous read request incremented by the byte count is greater than an address of the next read request.

FIG. 2 illustrates in more detail the interface between control block chain 24 and buffer 26. In particular, the control block chain 24 is illustrated as a set of control blocks inter-linked to one another by a pointer. For example, a next field denoted as "NXT" within the first control block (CB0) points to the second control block (CB1), and so forth to complete the chain. Another field, denoted as "BP", contains a value which points to a corresponding storage block within buffer 26. In the example shown, CB0 points to block 0, CB1 points to block 1, etc. The BP, or buffer pointer field, is used to indicate a particular portion of buffer 26 (i.e., storage block) to which or from which DMA transferred data is targeted or is sourced. Included in each control block are also storage block size and some control fields, storage block size fields and status fields. In this manner, each control block is configured as a portion of main memory during execution of OS, and the values therein are configured during execution of, e.g., a peripheral software driver, serve to control the transfer of data during a DMA operation by channels configured between, e.g., secondary memory and main memory. Those channels arise by virtue of a source address, destination address, transfer link, and buffer pointer values within respective control blocks or registers.

In addition to the fields above, a byte count field is also provided in each control block. A value is entered into a byte count field of a corresponding control block whenever a byte is transferred to a storage block associated with that control block. The byte count value will correspond with the number of bytes transferred. Thus, once a channel is established, each time a byte is transferred, a counter 30 will be incremented and that count value placed in a corresponding byte count field of the control block. When the byte count value matches the size of the storage block associated with that particular control block, the next control block will be used. Subsequent bytes being transferred will thereby increment the byte count value of that successive control block to indicate the number of bytes placed in the corresponding, successive storage block. For example, if 4K bytes are placed in storage block 0, then byte count of CB0 will indicate a 4K count. However, if an additional 2K of bytes are placed in storage block 1, then the byte count value of CB1 will indicate 2K of bytes. Once all of the storage blocks within buffer 26 are full, then DMA transfer will automatically cease. Counter 30 comprises any hardware logic needed to identify a particular control block and to increment the appropriate byte count value of that control block within control block chain 24.

In the example shown, processor 12 is a read requester. Processor 12 can forward a first read request to a first read request address. That address may or may not be within buffer 26. If the first read request address is within buffer 26, then that request can be serviced entirely from a faster main memory than a slower secondary memory, for example. Subsequent to the first read request, processor 12 can issue a second read request. The second read request is to a second read request address. In the interim between the first read request and the second read request, one or more DMA cycles occur and the appropriate byte counts are incremented: byte count within CB0 is incremented for the first DMA transfer, byte count within CB1 is incremented for the second DMA transfer, and so forth. Depending on where the second read request address is relative to the first read request address and the interim byte count, the second read request can either be serviced from buffer 26 or a peripheral device, such as secondary memory 22. FIG. 2 indicates secondary memory as being memory within an electromechanically driven memory subsystem, such as a disk drive, CD-ROM, CD-RW or DVD.

Of benefit is the read-ahead DMA request issued from the DMA controller and serviced by the secondary memory, albeit at a slower access rate than that which would occur within buffer 26. The serviced DMA request entails data sent from the secondary memory from a sequence of address locations. The read-ahead DMA request begins immediately after the first read request has been serviced, which culminates in an ending address of that first read request. The first DMA request is initiated upon reset "RST" of counter 30, and the appropriate byte count is incremented at each notch 32 shown in regard to secondary memory 22. Thus, secondary memory 22 can depict a track, wherein the first read requested data is a block within that track, followed by a second read requested data also within that track. The second read requested data is shown to occur at an address within the sequence of contiguous addresses beginning immediately after the first read request and culminating at a cumulative byte count several sequential bytes thereafter. In the example shown, the second read request can therefore be serviced entirely from buffer 26 since its block of addresses fall within the ending address of the first read request incremented by the byte count up to and including the cumulative byte count. However, if a portion (or the entirety) of the second read request address block occurs subsequent to the cumulative byte count, as shown by numeral 34, then the second read request must be serviced entirely from the secondary memory.

It is thereby important to note that the DMA data transferred from the secondary memory is transferred in sequential address order within the address space. Tabulating the total byte count of all control blocks within the chain, beginning with the last (ending) address of the preceding read request, the current read request can be determined to exist at an address within or outside the incremented sequential address kept track of by the total byte count.

Figure 3:
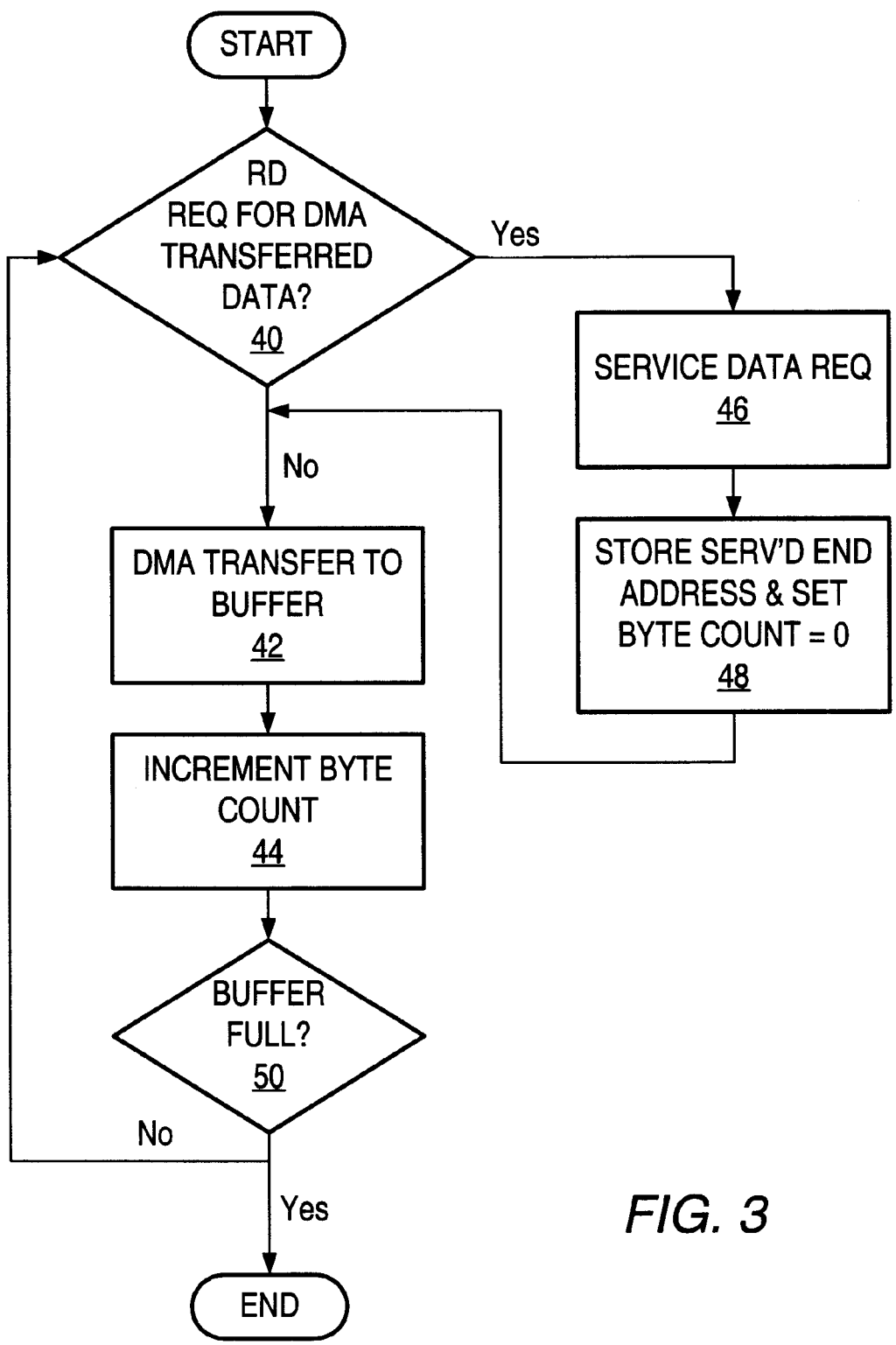
FIG. 3 is a flow diagram of hardware implemented to increment the byte count during DMA transfers.

Turning to FIG. 3, a flow diagram of hardware operations used to increment the byte count is shown. Each byte transferred to the buffer will increment a byte count within a corresponding control block. The incremented byte count is shown by block 44. Of benefit is the transferal of data from a slower secondary memory to a faster main memory in the interim between read requests. This allows subsequently addressed data upon the secondary memory to be placed in the main memory should that subsequently addressed data be needed by the read requester as a next read request.

If a read request is dispatched from a requester, then the data request must be serviced either from the buffer or the secondary memory, as shown by block 46. The ending address of that read request must then be stored and the byte count within all control blocks with corresponding data addresses less than or equal to the ending address set to zero, as shown by block 48. DMA transfers still occur even when servicing a data request if the requested data is within the buffer. Noting the ending address of the previous (i.e., serviced) address, any increments to the byte count thereafter will be noted as an addition to the address space necessary to indicate if the succeeding read request can be serviced from the local buffer. If the DMA transfers cause the buffer to be full 50, then DMA transfers will terminate. Otherwise, the process will be repeated, as shown.

Figure 4:
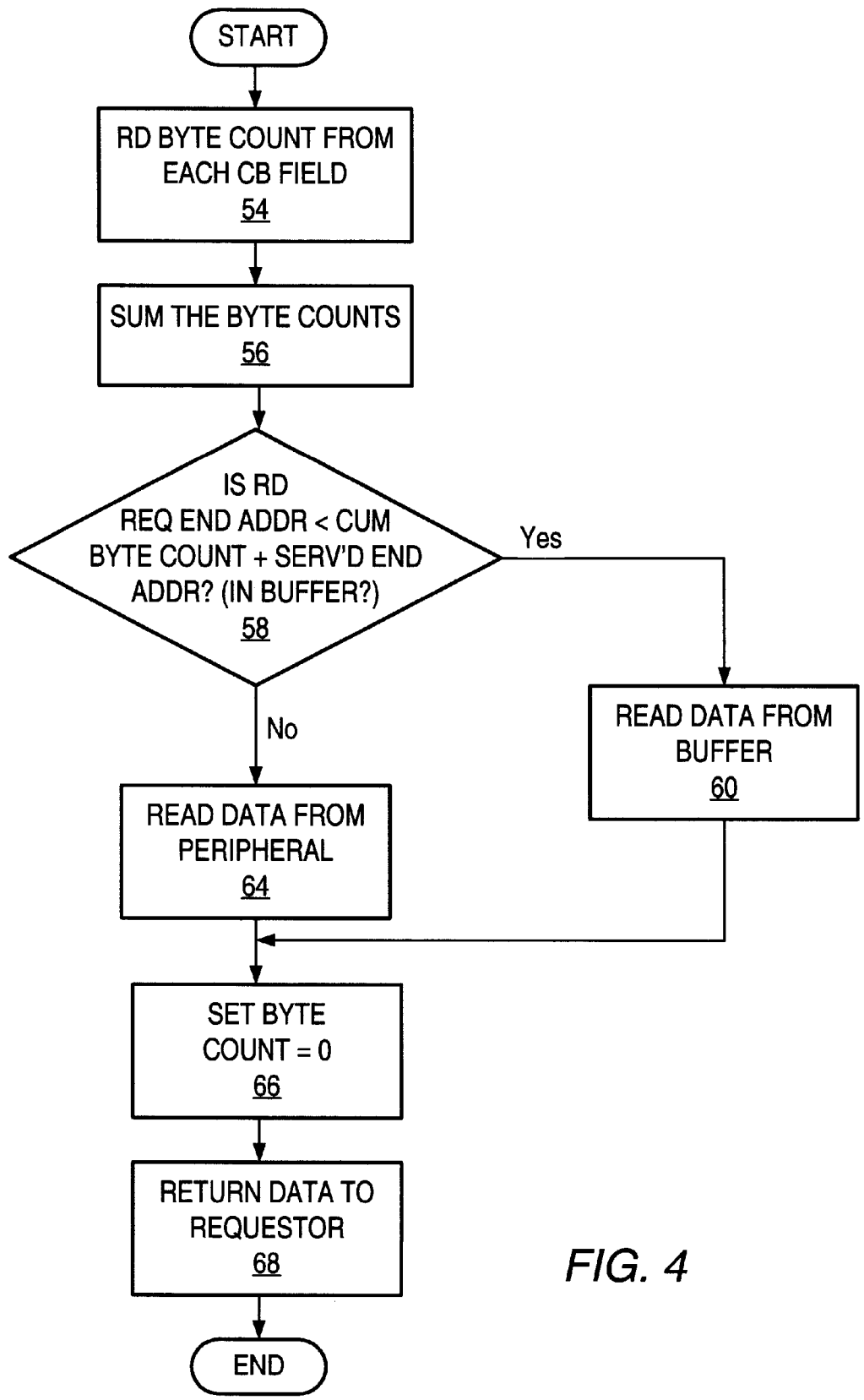
FIG. 4 is a flow diagram of peripheral driver software used to determine if requested data is to be read from the read-ahead buffer or the peripheral device depending on whether the read requested data is at an address that is within the range of the previously serviced ending address incremented by the byte count.

FIG. 4 illustrates a flow diagram of software used to discern whether or not a read request will be serviced from a local buffer or from the secondary memory (or peripheral device). The software resides as a peripheral driver software module. The driver software interacts with, for example, application software which periodically requests data that may have been DMA transferred. Depending on when the application software requests the data, a large or small cumulative byte count will be recorded. If the byte count is sufficiently large and requests occur to sequential addresses, it is more likely that those requests will be serviced exclusively from the faster buffer. More importantly, increments to the byte count keep track of the whereabouts of data and the location of that data relative to the previous read request ending address such that interrupts of the processor are not needed to achieve the same result.

FIG. 4 illustrates whether data of interest that has been previously transferred through a DMA cycle currently resides within a local buffer. More specifically, the driver software interacts with byte counts and transfer addresses to determine if a subsequent read request is within an address range stored in the buffer, or within a peripheral device connected to a more distal, peripheral bus. The byte count incremented by hardware can be read from each control block field, as shown by block 54. The byte count fields for each control block will be reset to zero immediately preceding the initial DMA transfer. Depending on whether one or multiple DMA transfers occur, the byte count value will be non-zero in the respective control blocks corresponding with respective DMA transfers. Each byte count value among the control blocks will be summed to form a cumulative byte count, as shown by block 56.

Knowing the last (or ending) address requested by a read requester proves beneficial in that the byte count merely notes a sequential addition to that ending address. If the subsequent read request (including the entire read request address) is within the range of addresses formed by incrementing the previous ending read address previously serviced and incremented by the byte count, then the next read request can be serviced entirely from the buffer, as shown by decision blocks 58 and 60. When reading the data, the DMA controller continuously fills the buffer and will terminate filling the buffer only if the buffer is full, errors occur, or the device driver stops the DMA controller. In this fashion, a subsequent read request will be compared with the transferred read request address incremented by the byte count, whenever the cycle is continued.

If the read request, sequential address range is not within the buffer, then the data will be read from the peripheral 64. The peripheral includes any device which contains sequential addressable data, a suitable peripheral device being a disk drive, a CD ROM, a CD-RW or a DVD.

Regardless of whether data is taken from the peripheral or the buffer, the byte count must be reset to zero after the data has been read, as shown by block 66. If the data is taken from the buffer, the byte count for any control block whose data address is between the previous read request and the current read request must also be reset to zero. Once the data is read from either the peripheral or local buffer, the data is then returned to the requester which initiated the read request, as shown by block 68. The data requester includes any application program or operation system code which gains access speed advantage drawing data from the buffer rather than from a peripheral device. Periodically the processor will be called upon to fetch data requested by an operating system or application program. That data may or may not be sequential to a previous address request. If it is, then it is likely that the subsequent request will entail a "hit" to the local buffer rather than from the peripheral device which contained the data prior to an interim DMA transfer.

Various modifications and changes may be made as would be obvious to a person skilled in the art having the benefit of this disclosure. The embodiments illustrate examples of a chain of control blocks contained within main memory, and used to call upon respective memory blocks which form a read-ahead buffer. The read-ahead buffer (or buffer) can be bifurcated into a series of storage blocks, each storage block controlled by a respective control block. If thusly arranged, the storage blocks need not be contiguous address spaces within the main memory address space. Alternatively, the storage blocks can be a contiguous, singular block of sequential addresses, if adequate space is found within the main memory. If a single contiguous address space forms the buffer, then only one control block need point to that space. However, if a contiguous, single address space is not present, then the address space can be separated into multiple contiguous spaces, each of which is controlled by a unique control block. It is intended that the following claims be interpreted to embrace all such modifications and changes as would be obvious to a person skilled in the art having the benefit of this disclosure and, accordingly, the specification and drawings are to be regarded in an illustrative rather than a restrictive sense.

What is claimed is:

1. A computer system, comprising:
   a buffer operably coupled to a secondary memory of the computer system
   a control block configured with contiguous and sequential addresses within the secondary memory containing a corresponding sequence of data bytes;
   a counter which increments a byte count within the control block as each of the sequence of data bytes is transferred from the secondary memory to the buffer; and
   a requester coupled to forward a first read request, and a combination of the byte count and the address of the first read request is used to note the quantity and location of a sequence of bytes transferred to the buffer subsequent to the first read request and, if an address of a second read request subsequent to the first read request is within the noted quantity and location of the transferred sequence of bytes, the second read request will be serviced entirely from the buffer instead of the secondary memory.

2. The computer system as recited in claim 1, wherein the buffer resides within main memory of the computer system.

3. The computer system as recited in claim 1, wherein the secondary memory comprises a electromechanically driven transmitter and receiver.

4. The computer system as recited in claim 1, wherein the secondary memory comprises a compact disk read only memory memory (CD ROM), compact disk read/write memory (CD RW), or DVD.

5. The computer system as recited in claim 1, wherein the secondary memory comprises a disk drive.

6. The computer system as recited in claim 1, wherein the byte count is updated absent an interrupt signal being forwarded to a host processor coupled to the buffer and the secondary memory.

7. The computer system as recited in claim 1, wherein access times to the secondary memory is slower than access times to the buffer.

8. A computer system main memory, comprising:
   a series of storage regions spaced throughout the main memory;
   a series of control blocks, each of which includes:
       a pointer field configured to point to a respective one of the storage regions;
       a byte count field configured to be incremented as each of a plurality of data bytes is transferred in address sequence to the storage regions during a direct memory access (DMA) cycle; and
   wherein a value stored in the byte count field denotes an amount of sequentially addressed data bytes present within the storage regions and therefore available for a read request serviced entirely from the storage regions.

9. The computer system main memory as recited in claim 8, wherein the storage regions and the control blocks are storage elements embodied as semiconductor memory.

10. The computer system main memory as recited in claim 8, further comprising a computer system secondary memory having access times greater than the computer system main memory, and wherein the secondary memory forwards the plurality of data bytes in address sequential order from the secondary memory to the storage regions.

11. The computer system main memory as recited in claim 10, wherein the value stored in the byte count field denotes an address sequentially subsequent to an address of the read request to allow the read request to be serviced entirely from the storage regions instead of the computer system secondary memory.

12. The computer system main memory as recited in claim 10, wherein the value stored in the byte count field denotes an address sequentially prior to an address of the read request to allow the read request to be serviced entirely from the computer system secondary memory instead of the storage regions.

13. A method for tracking the presence of data sequentially fetched from a secondary memory to a main memory of the computer system, comprising:
   issuing a first read request by a data requester;
   noting a first address of the first read request within a sequential order of addresses;
   incrementing a byte count for each byte of data fetched sequentially subsequent to the first read request address;
   issuing a second read request; and
   servicing the second read request entirely from the main memory if a second address of the second read request within the sequential order of addresses is less in sequential order than the sum of the first address incremented by the byte count.

14. The method as recited in claim 13, wherein said noting comprises storing a last address of data requested by the first read request of the data requester.

15. The method as recited in claim 14, wherein said incrementing comprises incrementing starting at the last address of data requested by the first read request and ending when a buffer which stores the data requested is full, or when a software driver code which controls a DMA controller software terminates data transfer.

16. The method as recited in claim 15, wherein said servicing comprises servicing the second read request exclusively from the main memory if a last address of data requested by the second read request of the data requester is less in sequential order than the sum of the last address of data requested by the first read request incremented by the byte count.

17. The method as recited in claim 13, wherein said incrementing between the time of the first read request and the second read request occurs absent interrupting a host processor coupled to the secondary memory and the main memory.

18. The method as recited in claim 13, wherein said incrementing comprises counting the number of bytes and therefore the number of addresses associated with said bytes fetched from the main memory according to a sequential order at which the bytes were initially ordered and subsequently transferred from the secondary memory.

19. The method as recited in claim 13, wherein said incrementing comprises counting the number of bytes and therefore the number of addresses associated with said bytes fetched from the secondary memory according to a sequential order at which the bytes are sequentially arranged within the secondary memory.

* * * * *